US008880241B2

(12) United States Patent
Mohamadi

(10) Patent No.: US 8,880,241 B2
(45) Date of Patent: Nov. 4, 2014

(54) VERTICAL TAKEOFF AND LANDING (VTOL) SMALL UNMANNED AERIAL SYSTEM FOR MONITORING OIL AND GAS PIPELINES

(71) Applicant: Farrokh Mohamadi, Irvine, CA (US)

(72) Inventor: Farrokh Mohamadi, Irvine, CA (US)

(73) Assignee: Farrokh Mohamadi, Irvine, CA (US)

( * ) Notice: Subject to any disclaimer, the term of this patent is extended or adjusted under 35 U.S.C. 154(b) by 0 days.

(21) Appl. No.: 13/772,161

(22) Filed: Feb. 20, 2013

(65) Prior Publication Data

US 2014/0236390 A1     Aug. 21, 2014

(51) Int. Cl.
| | |
|---|---|
| *G05D 1/10* | (2006.01) |
| *G01S 19/01* | (2010.01) |
| *G01C 21/00* | (2006.01) |
| *B64C 27/10* | (2006.01) |
| *B64C 19/00* | (2006.01) |
| *B64C 29/00* | (2006.01) |
| *B64D 47/08* | (2006.01) |
| *B64C 39/02* | (2006.01) |

(52) U.S. Cl.
CPC .............. *B64C 19/00* (2013.01); *B64C 29/00* (2013.01); *B64D 47/08* (2013.01); *B64C 2201/145* (2013.01); *B64C 2201/024* (2013.01); *B64C 2201/18* (2013.01); *B64C 2201/123* (2013.01); *B64C 2201/146* (2013.01); *B64C 39/024* (2013.01)
USPC ...... 701/2; 701/3; 701/16; 701/468; 701/467; 244/190

(58) Field of Classification Search
CPC ............ B64C 39/024; B64C 2201/024; B64C 2201/123; B64C 2201/146; B64C 2201/18; B64C 2201/12
See application file for complete search history.

(56) References Cited

U.S. PATENT DOCUMENTS

| | | | | |
|---|---|---|---|---|
| 4,818,990 | A  * | 4/1989 | Fernandes | ................. 340/870.07 |
| 5,890,441 | A  * | 4/1999 | Swinson et al. | .............. 244/12.3 |
| 6,023,061 | A  * | 2/2000 | Bodkin | .......................... 250/332 |
| 6,963,307 | B2 | 11/2005 | Mohamadi | |
| 7,042,388 | B2 | 5/2006 | Mohamadi | |
| 7,228,227 | B2 * | 6/2007 | Speer | ............................ 701/467 |
| 7,302,316 | B2 * | 11/2007 | Beard et al. | ..................... 701/11 |
| 7,839,283 | B2 | 11/2010 | Mohamadi | |
| 8,056,864 | B2 * | 11/2011 | Hays et al. | .................. 244/172.4 |
| 8,162,256 | B2 * | 4/2012 | Goossen et al. | ........... 244/110 E |
| 2006/0091310 | A1* | 5/2006 | Furry | ............................ 250/330 |
| 2007/0126395 | A1* | 6/2007 | Suchar | .......................... 320/109 |
| 2010/0168939 | A1* | 7/2010 | Doeppner et al. | .............. 701/16 |
| 2011/0068224 | A1* | 3/2011 | Kang et al. | ..................... 244/116 |
| 2011/0133089 | A1* | 6/2011 | Tolton et al. | ............... 250/338.5 |
| 2011/0210883 | A1 | 9/2011 | Mohamadi | |
| 2011/0301784 | A1* | 12/2011 | Oakley et al. | ...................... 701/2 |
| 2012/0078451 | A1* | 3/2012 | Ohtomo et al. | .................. 701/15 |
| 2014/0124621 | A1* | 5/2014 | Godzdanker et al. | ..... 244/110 E |

* cited by examiner

*Primary Examiner* — Michael J Zanelli
(74) *Attorney, Agent, or Firm* — Haynes and Boone, LLP

(57) ABSTRACT

Extended-range monitoring and surveillance of facilities and infrastructure—such as oil, water, and gas pipelines and power lines—employs autonomous vertical take-off and landing (VTOL) capable, small unmanned aerial system (sUAS) aircraft and docking platforms for accommodating the sUAS aircraft. Monitoring and surveillance of facilities using one or more embodiments may be performed continually by the sUAS flying autonomously along a pre-programmed flight path. The sUAS aircraft may have an integrated gas collector and analyzer unit, and capability for downloading collected data and analyzer information from the sUAS aircraft to the docking platforms. The gas collector and analyzer unit may provide remote sensing and in-situ investigation of leaks and other environmental concerns as part of a "standoff" (e.g., remote from operators of the system or the facilities) survey that can keep field operators out of harm's way and monitor health of the environment.

20 Claims, 11 Drawing Sheets

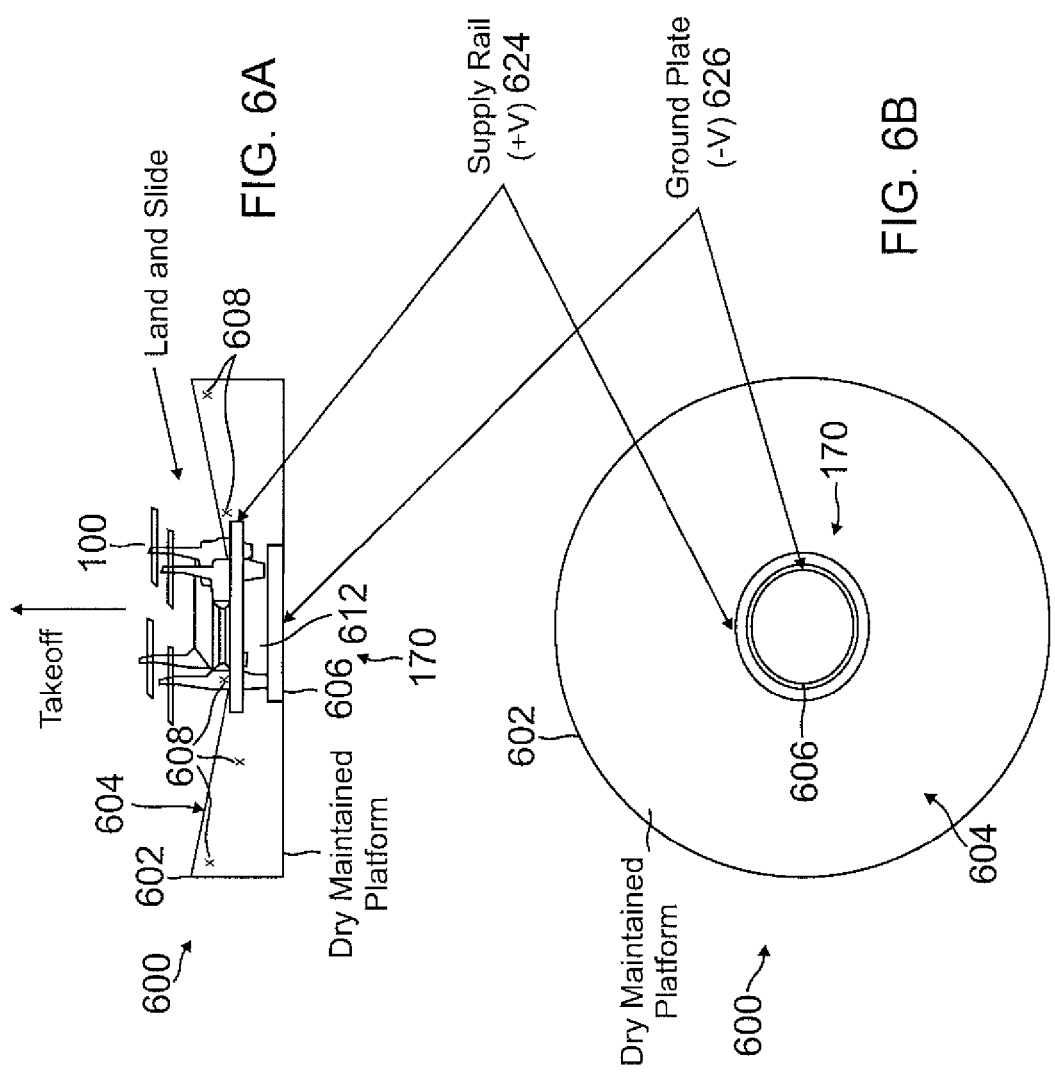

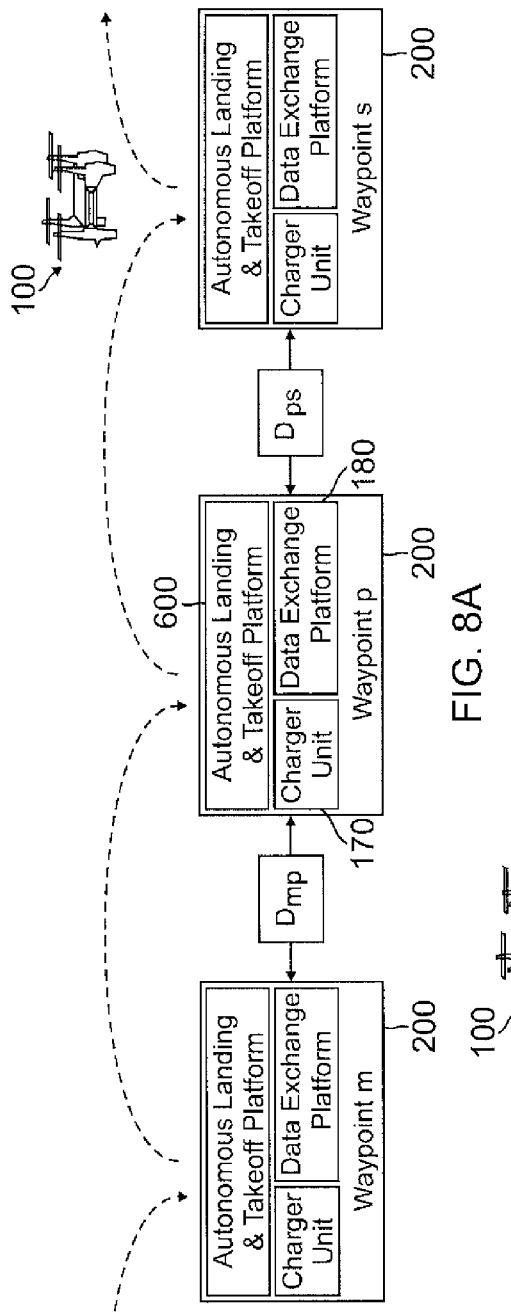
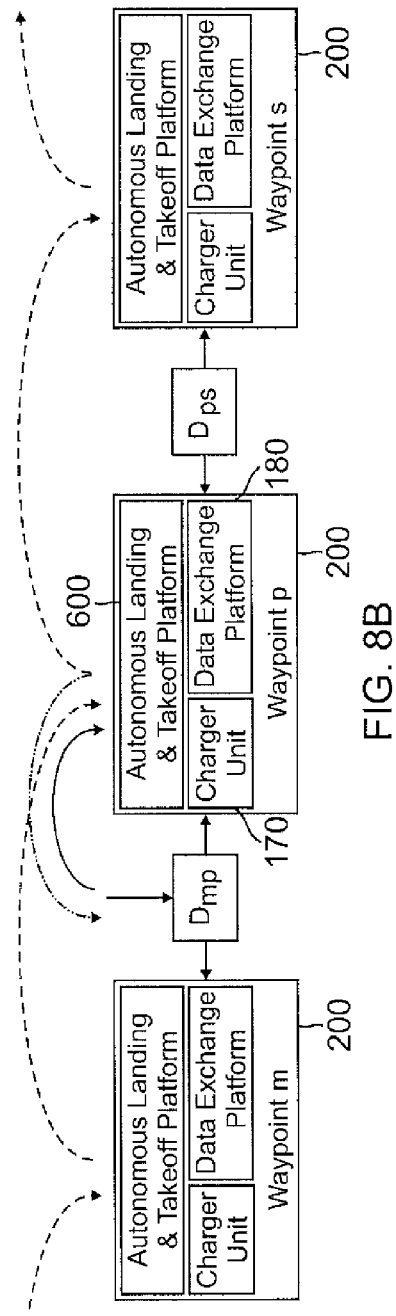
FIG. 8A
FIG. 8B

VERTICAL TAKEOFF AND LANDING (VTOL) SMALL UNMANNED AERIAL SYSTEM FOR MONITORING OIL AND GAS PIPELINES

BACKGROUND

1. Technical Field

Embodiments of the present invention generally relate to unmanned aerial vehicles and, more particularly, to small unmanned aerial systems with autonomous flight, remote sensing, and data communication capabilities.

2. Related Art

There is a need in the oil and gas industries for continual monitoring—whether periodic or constantly on-going—of pipelines for maintenance issues such as liquid or gas leakage. Such maintenance monitoring may give rise to a need to travel along the path of the pipeline and, for example, collect samples of air in the path to determine whether there is any undesired gas leakage. Other monitoring methods may include capturing optical and thermal images of the pipeline along its path for identifying the existence of any potential leaks or ruptures of the pipeline. Despite the fact that in-situ investigation of leaks or other health hazards and monitoring the health of the environment along the pipeline may expose field operators or other pipeline survey personnel to harm, application of automated systems to pipeline monitoring has been very limited due, at least in part, to the extensive length of a typical pipeline and the limitations imposed by the resulting requirement of long travel time and the high signal bandwidth needed to survey and report the status of the pipeline on a twenty-four hour a day, seven days a week basis.

BRIEF DESCRIPTION OF THE DRAWINGS

FIG. 6A is a cross sectional-elevation view of a docking platform and sUAS in accordance with one or more embodiments; FIG. 6B is a plan view of the docking platform shown in FIG. 6A.

FIGS. 8A and 8B are schematic diagrams illustrating alternative examples of operation of a system for extended-range monitoring and surveillance using sUAS aircraft and docking platforms, in accordance with one or more embodiments.

Figure 1A:
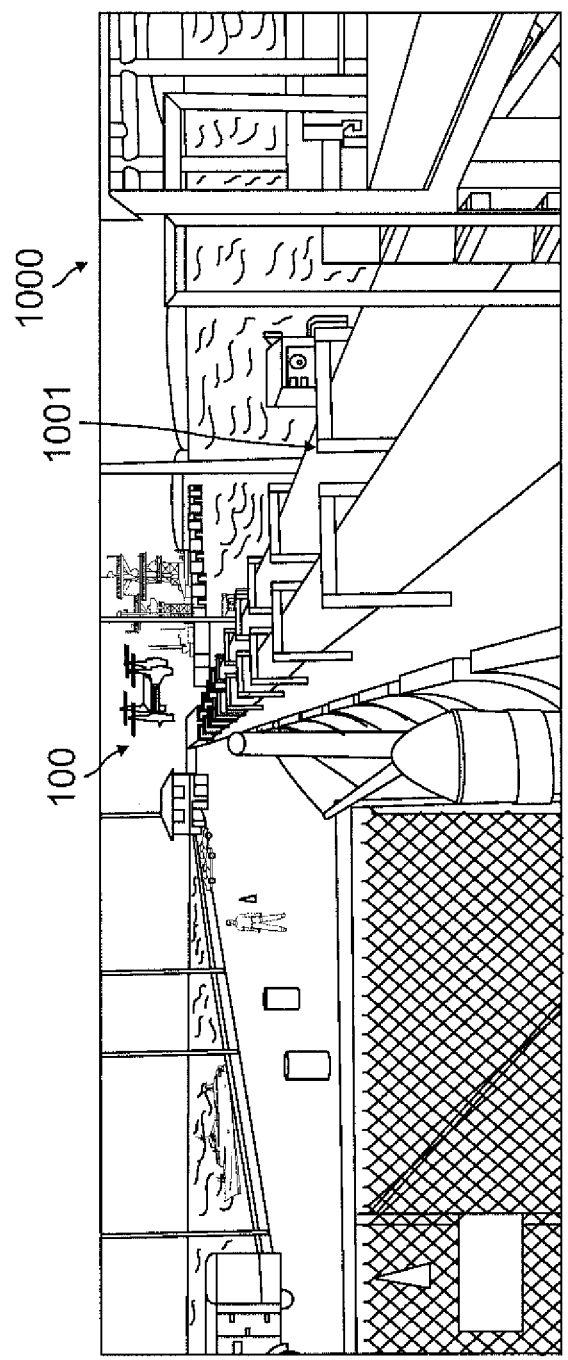
FIG. 1A is a perspective view illustrating a small unmanned aerial system (sUAS) for extended-range monitoring and surveillance, in accordance with one or more embodiments.

Embodiments of the present disclosure and their advantages are best understood by referring to the detailed description that follows. It should be appreciated that like reference numerals are used to identify like elements illustrated in one or more of the figures, in which the showings therein are for purposes of illustrating the embodiments and not for purposes of limiting them.

DETAILED DESCRIPTION

Broadly speaking, methods and systems according to one or more embodiments provide a unique solution for extended-range monitoring and surveillance of facilities and infrastructure—such as oil, water, and gas pipelines and power lines using vertical take-off and landing (VTOL) small unmanned aerial system (sUAS) aircraft and docking platforms for accommodating the sUAS aircraft. Monitoring and surveillance of facilities using one or more embodiments may be performed on an ongoing and continual basis, e.g., 24 hours a day, seven days a week, every day. One or more embodiments employ a unique solution of using a VTOL sUAS aircraft capable of traveling extended distances (e.g. about 15 miles or 24 kilometers (km) depending on battery technology) between docking platforms and over hundreds of way points (e.g., global positioning system (GPS) waypoints), which may be used to specify whatever path the sUAS aircraft is to survey, using, for example, a GPS and magnetometer based guidance system. The sUAS aircraft, according to one or more embodiments may be equipped with a combination, for example, of any of integrated optical cameras, infrared (IR) cameras, or an integrated miniature gas chromatograph system for sampling and detecting air and gas content. The system may provide the sUAS aircraft with the capability to land and takeoff from a set of preprogrammed stations (docking platforms) where the sUAS aircraft may land to download monitoring and surveillance data collected from its cameras, gas chromatograph, and other sensors; charge its batteries; and take off to resume travel along the pre-programmed path to the next waypoint, station, or docking platform; and repeat the cycle.

Although a variety of fixed wing unmanned aerial vehicles (UAV)s have been used for specific applications in which an aerial system is deployed to survey an area of interest, rotary wing systems can provide a number of advantages over fixed wing systems—such as lack of need for a runway and associated clear space. A rotary wing UAV with vertical takeoff and landing capability may be able to travel along the exact path of an oil or gas pipeline, for example, to collect samples of air in the path for identifying the existence of any undesired gas or liquid leakage, and to capture optical and thermal images in the path of the pipeline for detecting potential leak or rupture of the pipeline. Due to the rigors imposed by requirements of long travel time and high signal bandwidth to survey and report the status of a pipeline on an ongoing, nonstop basis, application of robotic systems to pipeline have been limited. Also, facility failures—such as pipeline breaks or ruptures—can subject field operators to health or environmental hazards. Thus, one or more embodiments may provide docking platforms for sUAS aircraft that have capability for autonomous landing and takeoff, for stopping at the docking platforms or at any other chosen location en route. The sUAS aircraft may have an integrated air and gas collector and analyzer unit, and capability for downloading collected data and analyzer information from the sUAS aircraft to one or more docking platforms. The air and gas collector and analyzer unit may, for example, provide remote sensing and in-situ investigation of leaks and other environmental concerns.

The autonomous sUAS aircraft, according to one or more embodiments, may provide a "standoff" (e.g., remote from operators of the system or the facilities) survey that can keep field operators out of harm's way and monitor health of the environment.

Methods and systems for extended-range monitoring and surveillance of facilities and infrastructure may provide, according to one or more embodiments: a waterproof autonomous takeoff and landing-capable, sUAS aircraft with integrated gas detection capability; a waterproof autonomous takeoff and landing-capable, sUAS aircraft with integrated thermal and optical video recording capability; a docking platform—placed at certain waypoints—with electrical power supply capabilities (e.g., solar panel or electrical generator) that automatically connects to the sUAS to charge its batteries; a method of autonomous landing of the sUAS to properly place it, using gravity force, in position to be charged; a method of autonomous landing of the sUAS to properly place it, using magnetic coupling force, in position to be charged; automatic charging of the sUAS battery after landing on a platform using one or more of solar cell energy, rectified alternate current, or transformer based electro-magnetic (EM) coupling and rectification; automatic transfer of video and detected gas information at a docking platform using any of various wireless techniques as well as infrared (IR) or optical; auto-sensing data transfer task completion and battery charge completion for resuming travel to the next docking platform; pre-specification and programming of sUAS flight path with multiple (e.g., hundreds of) GPS waypoints to cover or traverse the entire path of a gas or oil pipeline, including adjusting the direction and altitude of the sUAS at each waypoint; cloud computing capability linked to sUAS or docking platforms to address in-situ evaluation of detected level of gas in atmosphere over a pipeline; novel methods of collecting and injecting large volumes of gas into the gas detector unit for increased accuracy of detection and analysis; on-demand, high resolution thermal and optical images of a pipeline at a desired location using GPS positioning guidance; a thermally wire meshed docking platform for maintaining the temperature of the platform and keeping it dry for operations in rain as well as snowy and icy environments.

Figure 1B:
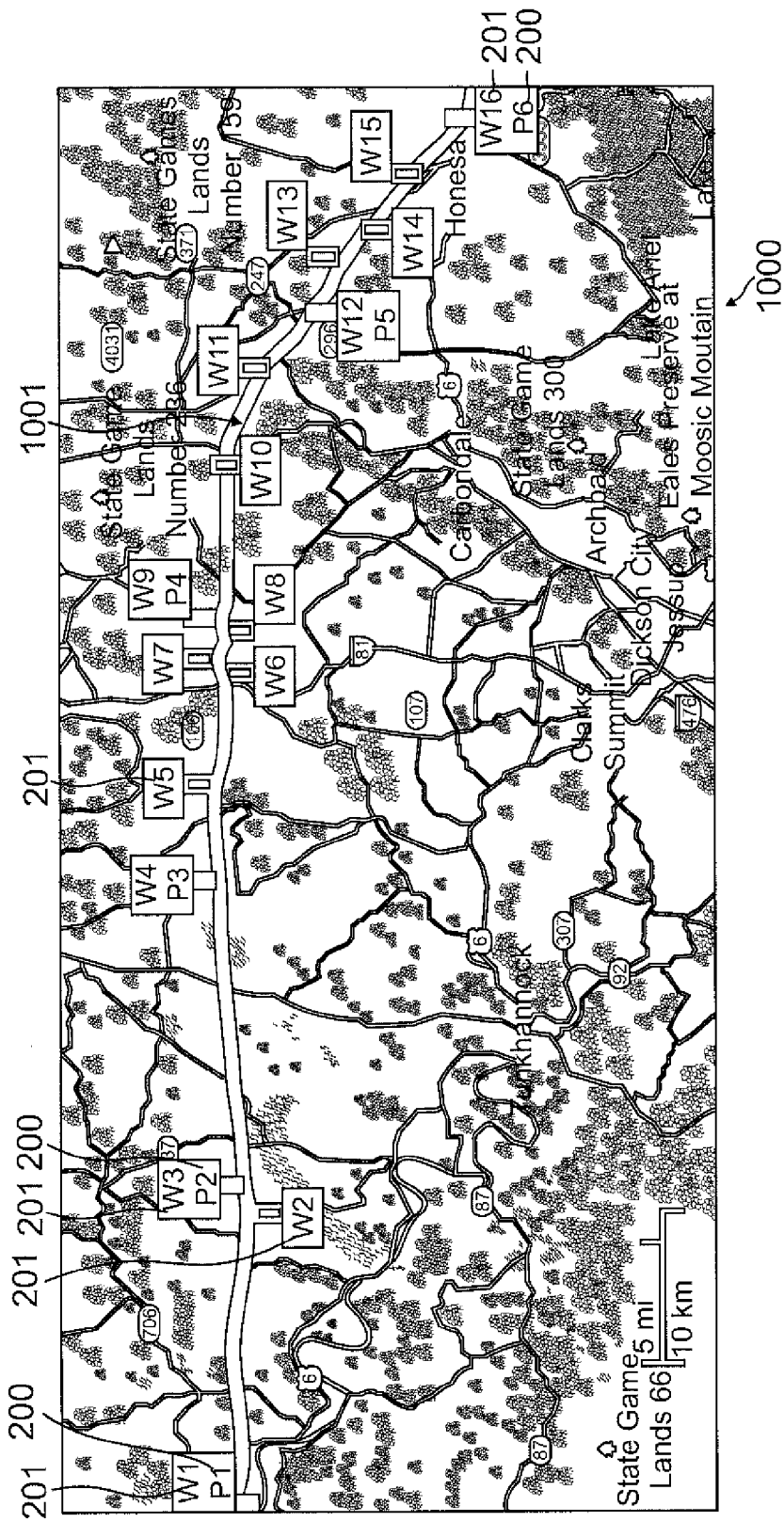
FIG. 1B is an aerial or map view illustrating a system for extended-range monitoring and surveillance using sUAS aircraft and docking platforms, in accordance with one or more embodiments.

Referring to FIG. 1A; FIG. 1B; and FIG. 1C, a system 1000 for extended-range monitoring and surveillance, in accordance with one or more embodiments. System 1000 may incorporate or employ various features as disclosed in U.S. Pat. No. 7,839,283, issued Nov. 23, 2010, to Mohamadi; U.S. Pat. No. 7,042,388, issued May 9, 2006, to Mohamadi; and U.S. Pat. No. 6,963,307, issued Nov. 8, 2005, to Mohamadi, all of which are incorporated by reference.

FIG. 1A illustrates a small unmanned aerial system (sUAS) aircraft 100 (also referred to as sUAS 100 or aircraft 100) included in a system 1000, in accordance with one or more embodiments, for extended-range monitoring and surveillance, for example, of a pipeline 1001 and its related facilities.

Aircraft 100 may be, for example, a multi-rotor aircraft having vertical take-off and landing (VTOL) capability. Aircraft 100 may, thus, include a plurality of wing propeller units 150, each unit including a wing unit propeller 105, and a DC motor 151, situated on an arm 152 extended from aircraft 100 (see FIG. 6C). Each wing propeller unit 150 may include an ESC (electronic speed control) for driving the motor 151.

Each wing propeller unit 150 may include a local controller and a micro-electro mechanical (MEM) based gyro or accelerometer. Each wing propeller unit 150 may be protected by a waterproof or weatherproof seal 154 (see FIG. 6C) so that aircraft 100 may remain operational under wet or extreme conditions. Aircraft 100 may also be augmented by attaching guards around the propellers for safe and quiet holding of station position. FIG. 1A shows a quad propeller sUAS 100 as an example, in position over a pipeline 1001.

In addition to carrying various sensor systems for monitoring pipeline 1001 (e.g., gas detection units, optical and infrared cameras), aircraft 100 may implement autonomous VTOL capability with a radar scanner (not shown) that may operate as an ultra-wideband (UWB) radio frequency (RF) radar that enables a capability of aircraft 100 to perform autonomous take-off and landing. As a dual function radar that operates in the license free band of 3-6 GHz, the UWB RF scanner may also be used, for example, as a motion detector and tracking system for surveillance of living objects near the pipeline 1001. The UWB RF scanner may emit rapid wideband pulses (e.g., sub-nano-second pulse width) that can penetrate glass, wood, concrete, dry wall and bricks. In the scanner receiver, a detector circuit may be employed to identify the reflections of transmitted pulses so the received periodic pulses may be manipulated to enhance SNR while maintaining very low transmission power and advanced signal processing algorithms may be employed to construct activity detection of a target. By using a remote controller unit 160 (see FIG. 2) aircraft 100 may be remotely guided and can use the radar capability to land in a stationary position and scan a portion of the pipeline for detection of living objects, e.g., animals or people. While in motion or in stationary detection mode, aircraft 100 may process the data it collects and display the activity level in real-time. Alternatively, a cluster of high resolution optical and thermal cameras may provide persistent imagery of the area under surveillance and take advantage of the wireless link available on board aircraft 100. Aircraft 100 may have the capability of being configured to scan in the horizontal as well as in the vertical axis and may be capable of performing remote surveillance of areas of interest—such as a fire hazard—at extended standoffs from a remote operator of sUAS aircraft 100. The UWB RF scanner system can be used, for example, to map inside walls of a facility for constructing a 2-D image.

Figure 2:
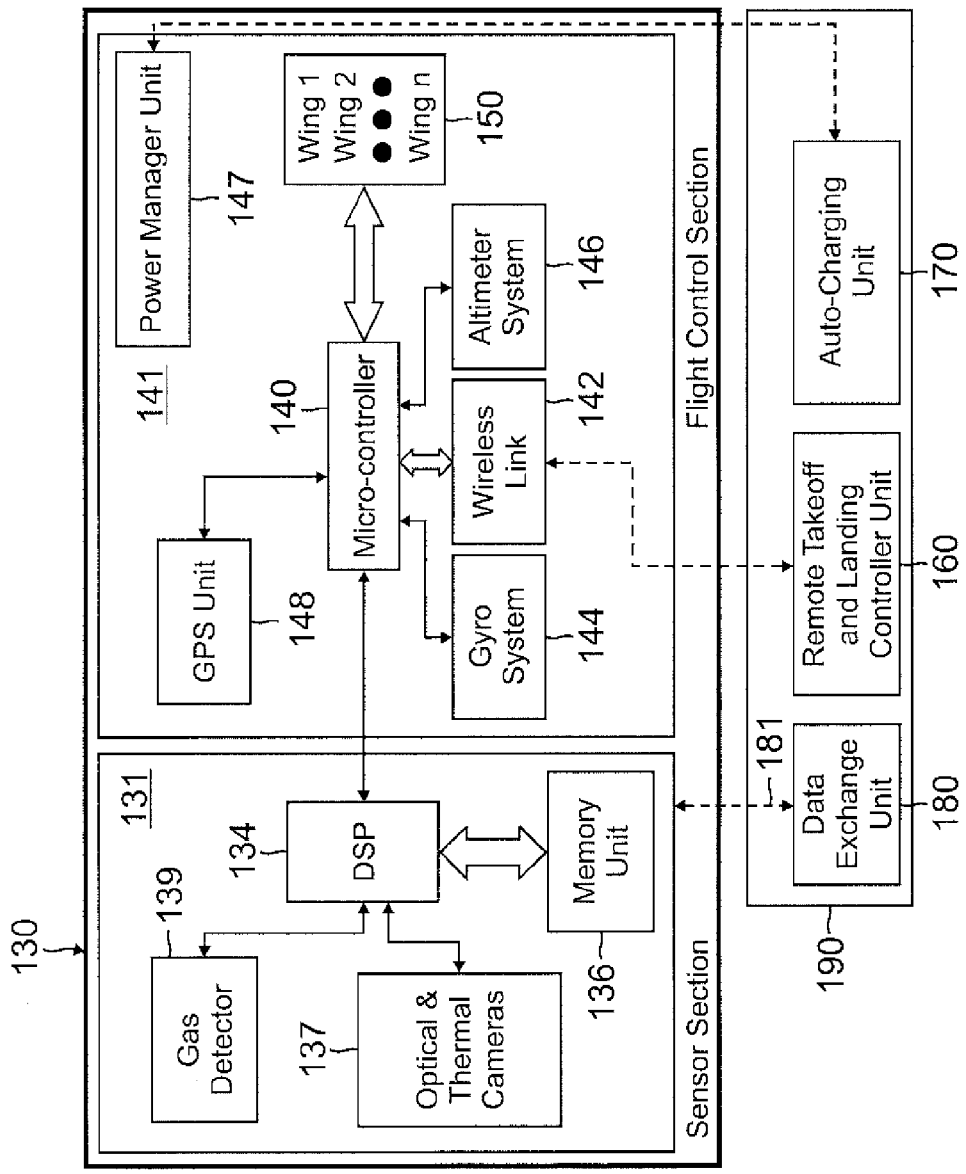
FIG. 2 is a system block diagram illustrating one example of a system architecture for an extended-range monitoring and surveillance system using sUAS aircraft according to one or more embodiments.

An autonomous hovering or station holding position, as well as autonomous takeoff and landing, of the VTOL sUAS aircraft 100 at a pre-defined waypoint (e.g., any of waypoints 201 shown in FIG. 1B) may employ the capabilities provided by a GPS unit 148 (see FIG. 2). The travelling path (or flight path) of sUAS 100 may be programmed by remote control or may be programmed in the field (e.g., directly, manually, or using a programming unit with operator interface). The aircraft 100 may fly to the pre-set GPS coordinates of a waypoint 201 (at which may be located a docking platform 200) by using a combination of its GPS guidance system, a magnetometer for coarse guidance validation, and a gyro guidance system in cases that GPS information gets denied. Upon reaching the vicinity of a waypoint 201, the VTOL sUAS aircraft 100 may activate its UWB radar scanner and may hover or circle at a constant altitude around the docking platform 200 or other selected area. Alternatively, any acoustic or IR based sensor cluster can perform the guidance systems for landing; the UWB landing system, however, is far less sensitive to snow, smog, and smoke conditions. Alternatively, a military grade GPS system can be used for precision landing positioning; the UWB radar landing system, however, incurs no security concerns. The sUAS aircraft 100 may sustain its hovering position by a GPS locked hovering operation.

Aircraft 100 also may be remotely operated, for example, by a single specialist. Aircraft 100 may have a total diameter less than 30 inches (in.) and total flying weight, including batteries and UWB RF scanner of less than 10.5 pounds (lb.). Aircraft 100 may have operational capability for vertical takeoff from any flat surface or surface sloped less than 45 degrees to a 100 ft. altitude in less than 10 seconds. Aircraft 100 may have operational capability for hovering from about 1.0 ft. to more than 1000 ft. above ground when locked to the GPS, e.g., using GPS unit 148. Aircraft 100 may have operational capability for sustained operation for at least 30 minutes of flight time with a quad battery cell that weighs about 960 grams and that operates with 13 Amp-hour and 20-30 C discharge capabilities (e.g., 1.0 C=Amp-hour capacity of battery/hour). The capacity may provides a 30 miles per hour (mph) speed, hence, in one flight cycle, the sUAS 100 can travel 15 miles or about 24 kilometers (km). Aircraft 100 may have operational capability for landing non-line-of-site (NLOS) using on-board radar capability.

FIG. 1B illustrates a system 1000, in accordance with one or more embodiments, for extended-range monitoring and surveillance using sUAS aircraft and docking platforms, using as an example an application to northeast Pennsylvania (Susquehanna and Bradford counties) northern tier gas pipelines. As shown in FIG. 1B a number of waypoints 201 (labeled W1-W16) may be defined along the pipeline 1001 for defining a flight path for aircraft 100. Waypoints 201 may be pre-programmed into a control unit, memory, or processor of aircraft 100 (see FIG. 2) for defining the flight path for aircraft 100. Although only 16 waypoints are shown in the example, other applications may require many more waypoints, and hundreds of waypoints, for example, could be programmed into aircraft 100. Each of the docking platforms 200 (labeled P1-P6) may be located by aircraft 100 using the particular waypoint defined for the respective docking platform 200. For example, docking platform P1 is at waypoint W1 and docking platform P6 is at waypoint W16 in the particular example illustrated by FIG. 1B, in which pipeline 1001 may be monitored autonomously by aircraft 100 with six docking platforms placed along the path (e.g., flight path) of pipeline 1000. The sUAS 100 may travel over 16 waypoints to adjust its coordination of travel. The entire pass to survey the pipeline flight path is about 100 km in this particular example, and the entire pipeline 1000 path may be surveyed autonomously in less than 5 hours under a conservative assumption that battery charging time for aircraft 100 is 30 minutes on each docking platform 200.

Figure 1C:
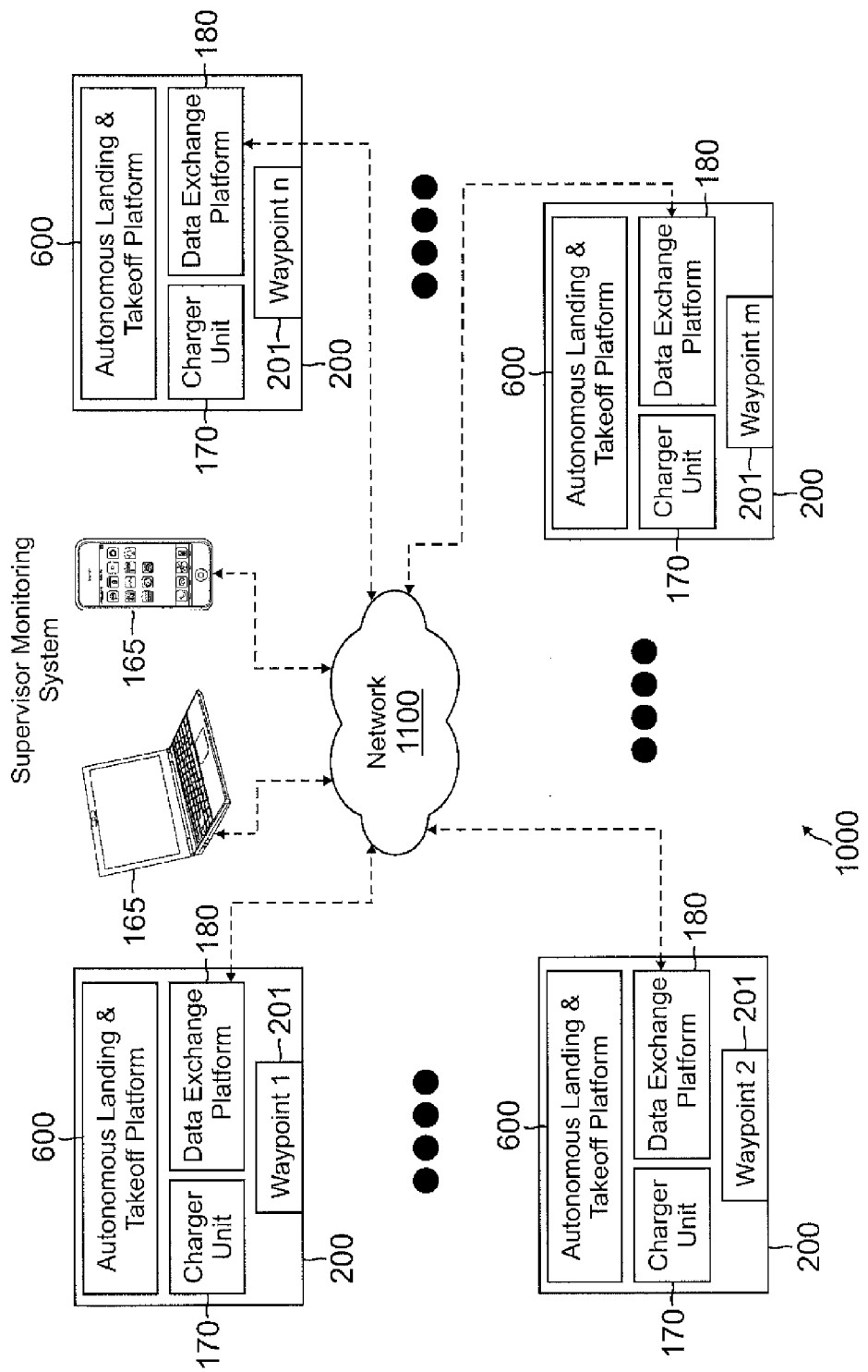
FIG. 1C is a system block diagram for docking platforms of an extended-range monitoring and surveillance system in accordance with one or more embodiments.

FIG. 1C illustrates data and information connectivity for an extended-range monitoring and surveillance system 1000 in accordance with one or more embodiments. As shown in FIG. 1C, system 1000 may include a number docking platforms 200 that may communicate with each other, with aircraft 100 (not shown in this figure), and with supervisor monitoring system 165 (that may also be included in control system 190 shown in FIG. 2) using network 1100. Network 1100 may be a local or wide area network (LAN or WAN) and may be connected to, or include, the Internet, and may make an option of cloud computing available to docking platforms 200 and aircraft 100. Each platform 200 may be equipped with its own ad hoc network (included in network 1100) or connected to the cloud (e.g., network 1100 including the Internet) such that data exchange by platform 200 with a central management unit (e.g. supervisor monitoring system 165) with encrypted data can be processed and shared with the management and crew in the field as shown in FIG. 1C.

FIG. 2 illustrates one example of a system architecture for an extended-range monitoring and surveillance system 1000 using sUAS aircraft 100 and including sensing, imaging, flight control, and telemetry system 130.

Sensing, flight control, and telemetry system 130 may include an imaging section 131 and a flight control section 141, which may communicate wirelessly via a remote controller unit 160 included in a control system 190. Remote controller unit 160 may communicate wirelessly with aircraft 100 and may conform, for example, to any of the open standards or may be a proprietary control system. Wireless network connectivity may be provided by remote controller unit 160.

Imaging section 131 may include a gas detector 139, which may include one or more components of a highly sensitive gas chromatograph. In addition, imaging section 131 may include optical and thermal cameras 137. Optical and thermal cameras 137 may include, for example, an optical video camera. Optical and thermal cameras 137 may include, for example, an infrared or thermal imaging camera that can be used, for example, for flame detection. The gas detector 139 and camera 137 may be connected to a digital signal processing (DSP) unit 134, which may access a memory unit 136 comprising, for example, a random access memory (RAM). The DSP unit 134 may communicate, as shown in FIG. 2, with flight control section 141.

Flight control section 141 may include a micro-controller 140. Micro-controller 140 may integrate all sensory and control inputs from the components of flight control section 141 and may provide control and telemetry outputs for sUAS 100. As shown in FIG. 2, micro-controller 140 may receive inputs from wireless link 142, which may provide operator control inputs from an operator at a remote location using, for example, a WiFi or RF remote controller unit 160. Micro-controller 140 may receive additional control and stabilizing inputs, for example, from gyro system 144 and altimeter system 146. Micro-controller 140 may receive position or location data from GPS system 148. For example, inputs from UPS system 148 may enable sUAS 100 to report its position via telemetry and to be monitored over Google maps, for example, using GPS. Micro-controller 140 may provide control outputs and receive feedback inputs from wing propeller units 150. Each wing propeller unit of the plurality of wing propeller units 150 may include a wing unit propeller, a DC motor, and an ESC for driving the motor. Each wing propeller unit may include a local controller and a micro-electro mechanical (MEM) based gyro or accelerometer. Flight control section 141 may also include a power manager unit 147 for providing and regulating electrical power to any of the systems of sUAS 100.

Figure 3:
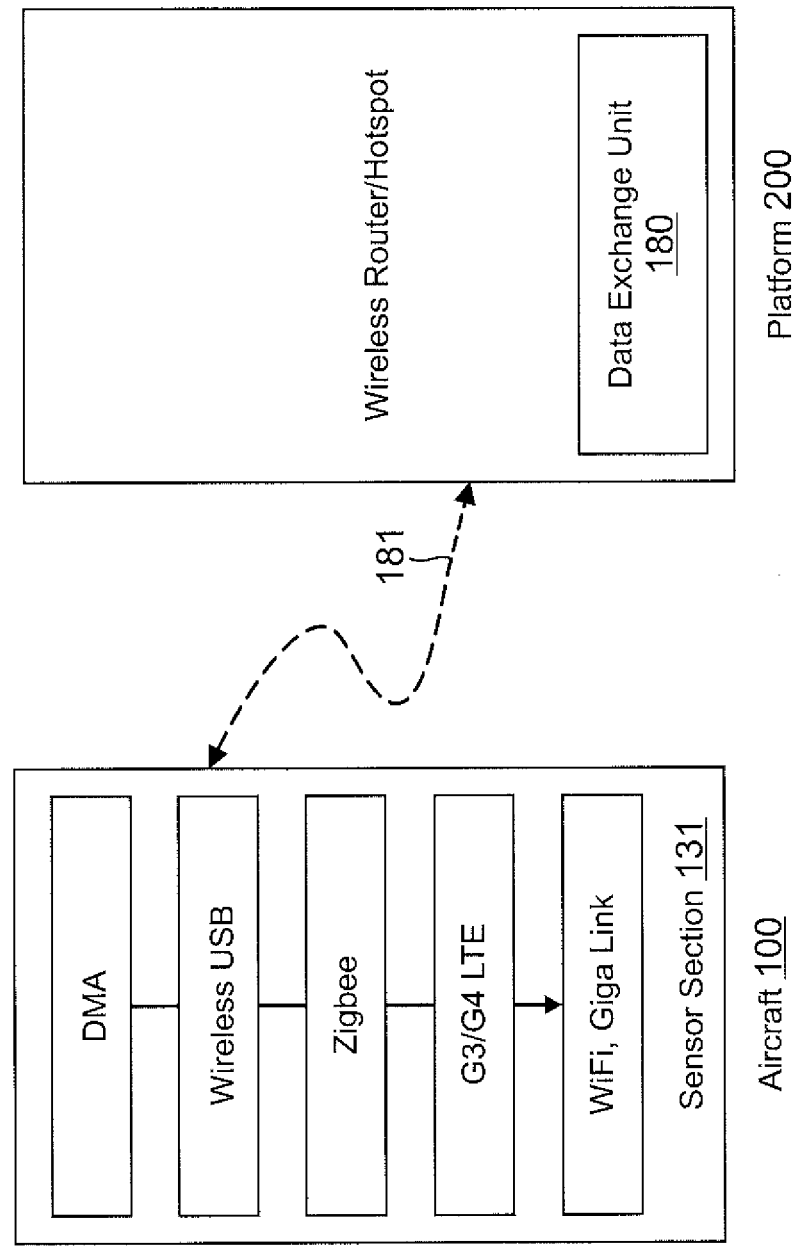
FIG. 3 is a block diagram of a communication link for transferring data between docking platforms and sUAS aircraft for an extended-range monitoring and surveillance system according to one or more embodiments.

FIG. 3 shows a communication link for transferring data between docking platforms 200 and sUAS aircraft 100 for an extended-range monitoring and surveillance system according to one or more embodiments. FIG. 3 illustrates several methods of transferring the data collected by aircraft 100 during the survey of pipeline 1001 to a docking platform 200, which may provide a wireless router or wireless hotspot. For example, direct memory access (DMA) may be provided to memory unit 136 of sensor section 131 of sensing, flight control, and telemetry system 130 of aircraft 100 for communication via link 181 with a data exchange unit 180 (see also FIG. 1C, FIG. 2) of a platform 200 by any of—or a combination of—wireless universal serial bus (USB), Zigbee wireless standard, G3/G4 LTE (Generation 3 or 4 Long Term Evolution), WiFi (e.g., based on Institute of Electrical and Electronics Engineers (IEEE) 802.11 standards), or Giga Link. Complexity of the data transfer may be substantially reduced by wireless or optical coupling to the data exchange unit 1180 placed on the docking platform 200.

Figure 4:
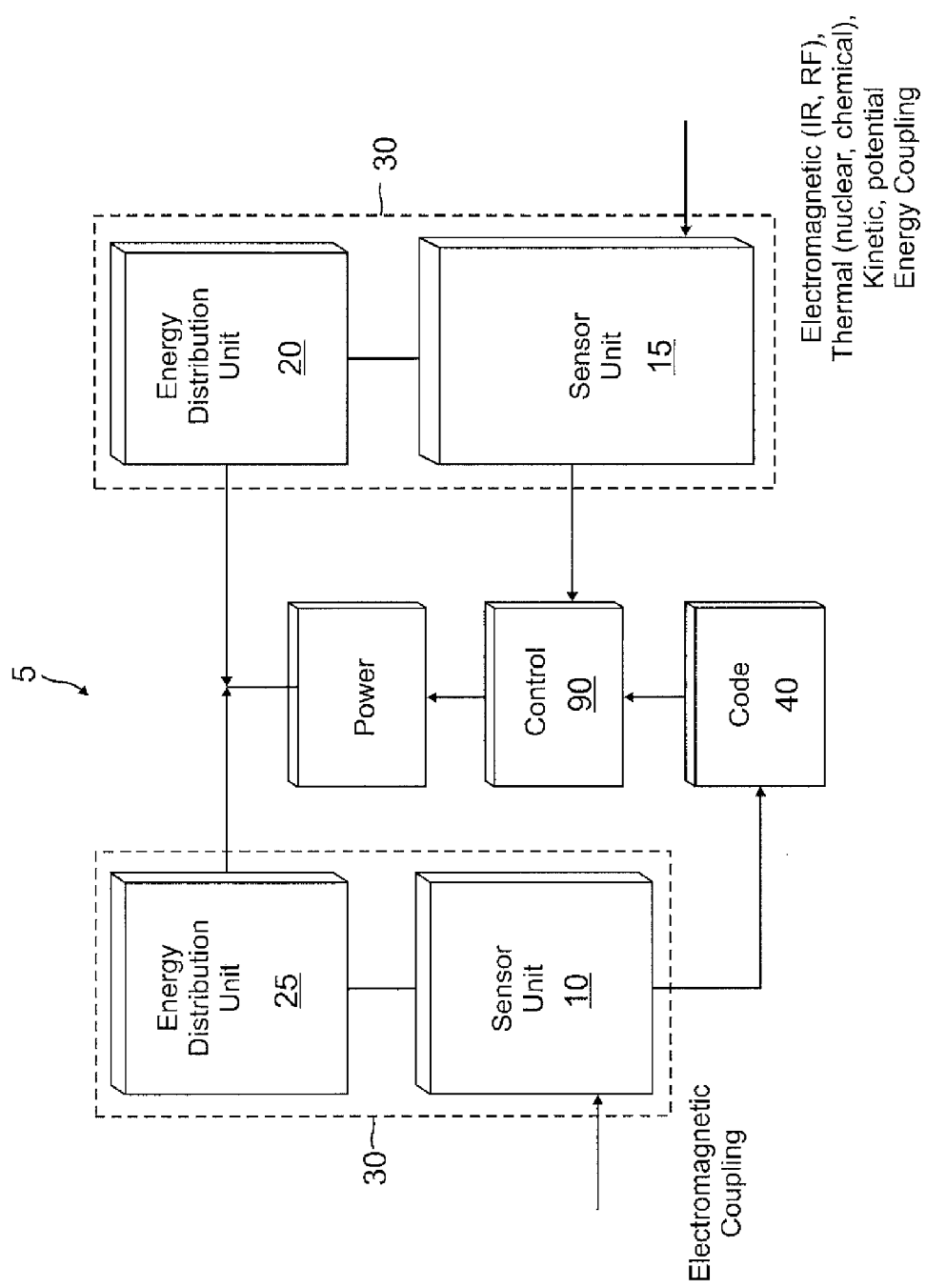
FIG. 4 is a block diagram of a wireless remote sensor according to one embodiment.

FIG. 4 illustrates a wireless remote sensor 5 according to one embodiment. Wireless remote sensor 5 may be located, for example, at a docking platform 200 for providing electric charge to a battery of aircraft 100. As seen in FIG. 4, a wireless remote sensor 5 may include a sensor 10 (e.g., an antenna or antenna array) that converts received RF energy into electrical current that is then coupled to energy distribution unit 25. Alternatively, other sources of energy besides RF energy—such as solar energy—may be converted to electrical charge by sensor unit 15 coupled to an energy distribution unit 20. For example, sensor unit 15 may sense and convert thermal energy (such as from a nuclear or chemical reaction), kinetic energy, pressure changes, light/photonics, or other suitable energy sources. Together, each sensor unit 10 or 15 and energy distribution unit 25 or 20 forms an energy conversion unit 30. To enable active rather than passive operation, wireless remote sensor 5 may also include a battery (not shown).

Code unit 40 may respond to the stimulation of sensor unit 10 or 15 and provide the proper code to indicate the source of the stimulation. For example, should sensor 15 be a piezoelectric transducer, impact of an object on sensor 15 may generate electrical charge about the size of the impact and its recorded environment. This information may then be transmitted wirelessly by sensor unit 15 to provide a remote sensing capability.

Energy conversion unit 30 may respond to a radio frequency (RF) stimulation (shown as electromagnetic coupling in FIG. 4). Sensor unit 10 within energy conversion unit 30 may, for example, act as a transformer which couples AC current through the primary winding to the secondary side of the transformer, where diodes may rectify the secondary current and supply it to a storage capacitor, which may then provide a rectified and smoothed current to power the remaining components in wireless remote sensor 5. For example, the current may be used to recharge batteries of sUAS aircraft 100.

Sensor unit 10, which can be an antenna array (hereinafter antenna array 10), and sensor unit 15 may detect environmental changes and respond with analog signals as is known in the art. Control unit 90 may provide an analog-to-digital (A/D) conversion to convert these analog signals into digitized signals. Control unit 90 may respond to these digitized signals by encoding RF transmissions by antenna array 10 according to codes provided by code unit 40. Code unit 40 may be programmed before operation with the desired codes or they may be downloaded through RF reception at antenna array 10 during operation. Depending upon the RF signal received at antenna array 10, the appropriate code from code unit 40 may be selected. For example, an external source may interrogate antenna array 10 with a continuous signal operating in an X, K, or W RF frequency band. Antenna array 10 may convert the received signal into electrical charge that is rectified and distributed by energy distribution unit 25. In response, control unit 90 may modulate the transmission by antenna array 10 according to a code selected from code unit 40 (using, for example, a code of 1024 bits or higher), thereby achieving diversity antenna gain. In embodiments having a plurality of codes to select from, the frequency of the received signal may be used to select the appropriate code by which control unit 90 modulates the transmitted signal. Although wireless remote sensor 5 may be configured for passive operation, significant increased range capability may be provided by using an internal battery (not illustrated).

Figure 5A:
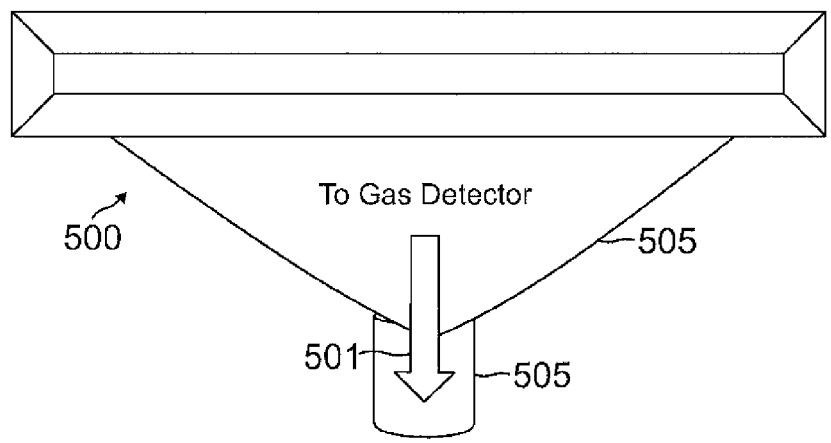
FIG. 5A is an elevation view of a gas collection fixture for an extended-range monitoring and surveillance system according to one or more embodiments.
Figure 5B:
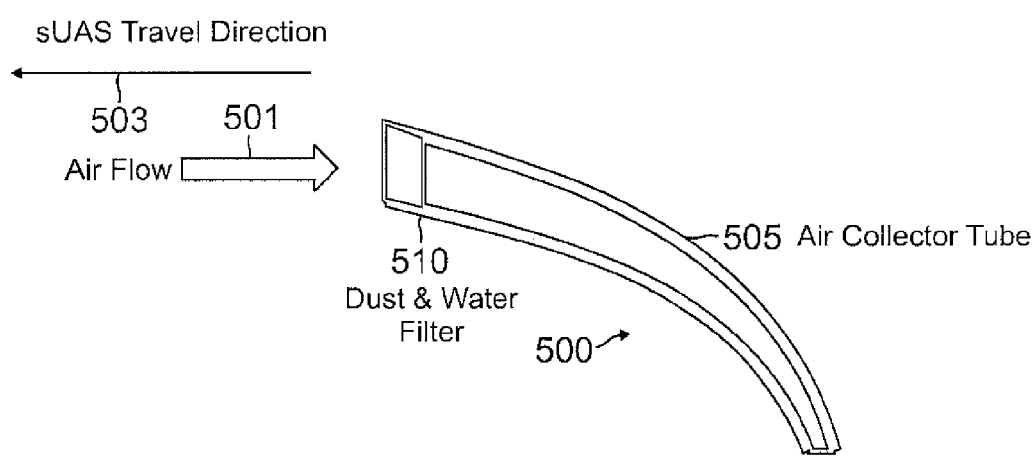
FIG. 5B is a cross sectional view of the gas collection fixture shown in FIG. 5A.

FIGS. 5A and 5B show a gas collection fixture 500 for an extended-range monitoring and surveillance system 1000 according to one or more embodiments. Gas collection fixture 500 may include an air collector tube 505 and dust and water filter 510 as shown. Gas collection fixture 500 may be mounted on sUAS aircraft 100 so as to face the direction of travel 503 of sUAS aircraft 100, as shown in FIG. 5B. With gas collection fixture 500 mounted facing the travel direction 503, the resultant air flow 501 generated by movement of aircraft 100 may be directed into dust and water filter 510 as shown in FIG. 5B and into air collector tube 505 as shown in FIG. 5A. Dust and water filter 510 of gas collection fixture 500 may filter the air for larger than specified particle size as well as reject water in the air entering the detector gas unit 139. As shown in the figures, the sUAS 100 may have one or more gas collection fixtures 500 that receive gases from the atmosphere in the direction of flight of sUAS 100.

FIGS. 6A and 6B show a landing platform 600 portion of a docking platform 200 configured for landing and properly positioning sUAS aircraft 100 at docking platform 200 so that sUAS aircraft 100 can commence its battery charging cycle while transferring its data—which may be time guided and time stamped by GPS—of gas concentration in the air, and optical and thermal sensor output collected during the survey (for example, during the traverse from the previously visited docking platform 200 to the current one).

As seen in FIGS. 6A and 6B, landing platform 600 portion of docking platform 200 may be shaped as an inverted cone or funnel so that upon landing around the periphery 602 of the large platform area 604 that addresses the inaccuracies of GPS in precision landing of sUAS 100, the mildly sloped platform area 604 allows sUAS 100 to slide upon landing towards the platform's center 606. Sliding of sUAS 100 toward center 606 may be aided or propelled by gravity due to the slope of platform area 604. Sliding of sUAS 100 toward center 606 also, or alternatively, may be aided or propelled by magnetic forces supplied by magnets 608 (e.g., electromagnets or permanent magnets) and guided by the surface shape or slope of platform area 604. Magnets 608 may be installed in both the platform area 604 and aircraft 100 and may be controlled to supply both attractive and repulsive forces so as to force aircraft 100 towards the platform's center 606 under the guidance of the platform's shape.

The material of the platform area 604 may be composed primarily of electrically insulating materials that have an embedded mesh of high resistance wires to melt ice or snow and evaporate rain or dew to ensure availability of battery charging for the sUAS 100 at any time of day and under all weather conditions.

Roller balls 610 (see FIG. 6C) under the arms (e.g., wing units 150) of the sUAS 100 may facilitate the sUAS to sink into a designed cavity 612, where electrical contact for battery charging for sUAS 100 may be established. The contacts upon activation of the charger may enable charging the batteries of sUAS 100. Electrical contact from the side of docking platform 200 may be supplied, for example, via supply rail 624 and ground plate 626. Electrical contact from the side of aircraft 100 may be supplied, for example, via V+ guard ring 614 and V− guard ring 616 as shown in FIG. 6C.

Figure 6C:
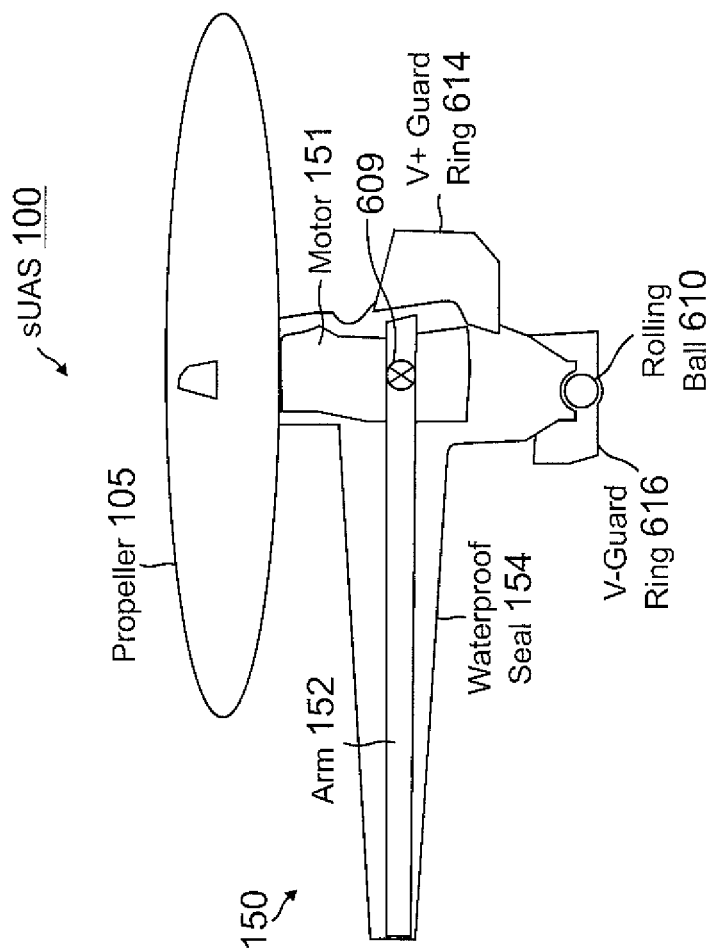
FIG. 6C is a cross sectional-side view of a portion of the sUAS shown in FIG. 6A.

FIG. 6C shows in greater detail the metallic contacts (e.g. V+ guard ring 614 and V− guard ring 616) in the sUAS 100 configured to fit to the charging unit 170, which may include cavity 612, supply rail 624, and ground plate 626. Each wing propeller unit 150 of sUAS 100 may incorporate a roller ball 610 that may be used to guide the sUAS 100 upon landing and turning off the DC motors 151 (and propellers 105). The weight of the sUAS 100 and slope of the platform area 604 may guide proper placement of the sUAS 100 and promote contacting the charging unit 170. It should be noted that instead of gravity guided placement, magnetic pellets 609 can be placed on the wing propeller units 150 so that the recessed cavity 612 can force the sUAS 100 to be attracted to the cavity 612 and charging unit 170 and be placed properly for battery charging contact.

Figure 7A:
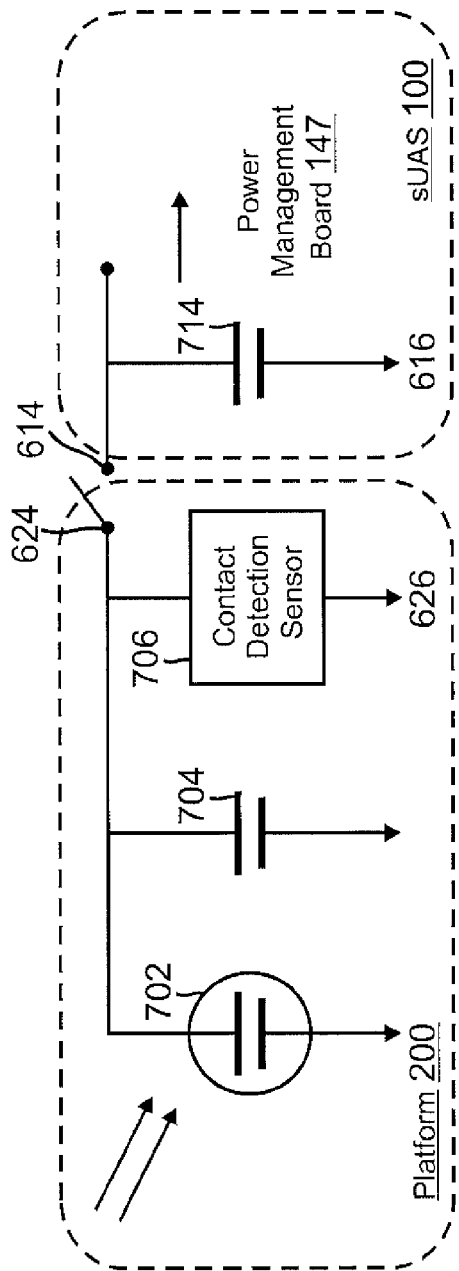
FIGS. 7A and 7B are circuit block diagrams showing alternative examples for charging sUAS batteries at a docking platform, in accordance with one or more embodiments.
Figure 7B:
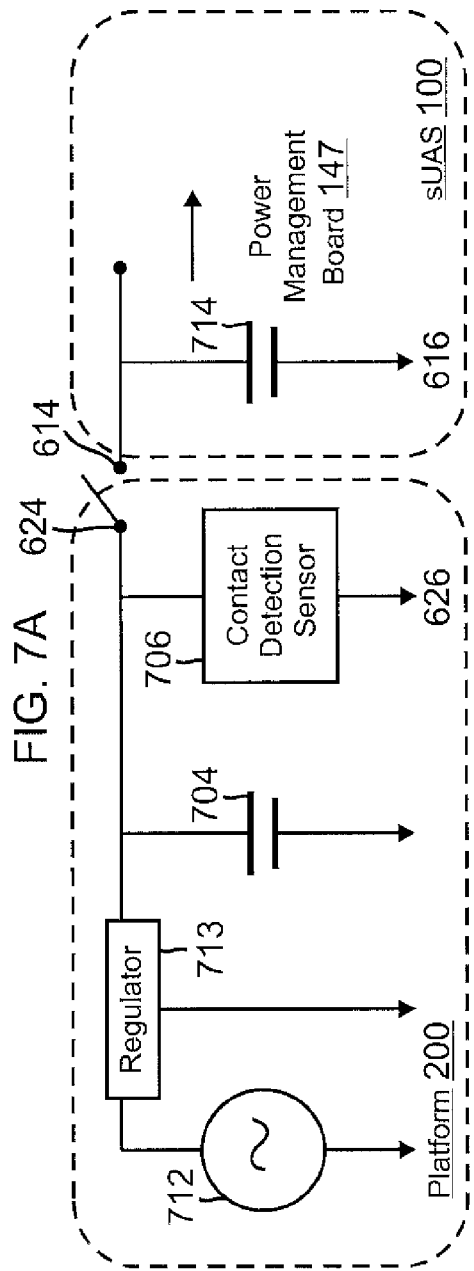

FIGS. 7A and 7B illustrate alternative examples of circuit diagrams for charging sUAS batteries at a docking platform 200, in accordance with one or more embodiments. FIG. 7A shows solar power source 702, filter capacitor 704, and contact detection sensor 706 connected by contacts supply rail 624 on docking platform 200 side to contacts V+ guard ring 614 on the sUAS 100 side, which may provide its own filter capacitor 714. Common ground contacts may be provided by ground plate 626 on docking platform 200 side to contacts V− guard ring 616 on the sUAS 100 side, as shown in both FIGS. 7A and 7B. Solar power source 702 may be, for example, a bank of solar cells, and contact detection sensor 706 may provide a signal to a power supply controller of charging unit 170 when sUAS 100 is properly connected to charging unit 170 for charging that charging may commence. Battery charging may be controlled on the sUAS 100 side by power manager unit 147.

FIG. 7B shows another alternative power source, alternating current power source 712, such as may be supplied conventionally off the power grid. Alternating current power source 712 may require regulator 713 for rectification, and regulating voltage, current, and power to contact 624.

FIGS. 8A and 8B illustrate some examples of operation of a system 1000 for extended-range monitoring and surveillance using sUAS aircraft 100 and docking platforms 200, in accordance with one or more embodiments.

FIG. 8A, shows a flight path of aircraft 100 traveling along between many waypoints (e.g. from waypoint m, separated by distance Dmp from waypoint p, to waypoint p, separated by distance Dps from waypoint s, to waypoint s) until the autonomous processor (e.g., micro-controller 140) decides that it should land on the next platform (at waypoint s in the example of FIG. 8A) to recharge batteries and perform a data dump of data collected along the previous traverse (the traverse along Dps in the example of FIG. 8A). In any case, the number of waypoints is at least the number of docking platforms as depicted in FIGS. 1B and 8A, since each docking platform will have an associated waypoint defined for it.

Based on a real-time request from the field, e.g., by a field operator communicating with sUAS 100 via a remote controller unit 160 or supervisor monitoring system 165, the sUAS 100 can be redirected to fly and hover over a certain GPS position (for example a waypoint intermediate two docking platforms such as waypoint W10 shown in FIG. 1B) so that additional data can be collected or the area under surveillance can be more closely investigated as shown in FIG. 8B, where sUAS 100 is directed to fly to a point on the traverse along Dmp between the docking platform at waypoint m and the docking platform at waypoint p.

Embodiments described herein illustrate but do not limit the disclosure. It should also be understood that numerous modifications and variations are possible in accordance with the principles of the present disclosure. Accordingly, the scope of the disclosure is best defined only by the following claims.

What is claimed is:

1. A system comprising:
an aircraft, including:
   a plurality of wing unit propellers for vertical takeoff and landing;
   a control system for controlling flight of the aircraft autonomously;
   a sensor section; and
   a power manager unit; and
a docking platform, including:
   a data exchange unit, wherein the data exchange unit communicates with the sensor section of the aircraft during docking of the aircraft at the docking platform; and
   a power supply unit that supplies power to the power manager unit of the aircraft during docking of the aircraft at the docking platform; and wherein:
the sensor section of the aircraft performs an auto-sensing of data transfer task completion and battery charge completion for resuming travel to a next docking platform.

2. The system of claim 1, wherein:
the docking platform is located at a global positioning system (GPS) waypoint; and
the GPS waypoint is programmed into the flight control system so that the aircraft flies under guidance of the flight control system to the docking platform.

3. The system of claim 1, wherein
the sensor section includes an integrated gas detector and analyzer and digital signal processing.

4. The system of claim 1, wherein
the sensor section includes integrated thermal and optical video recording cameras and digital signal processing.

5. The system of claim 1, wherein:
the docking platform automatically connects to the aircraft to charge its batteries.

6. The system of claim 1, wherein:
the sensor section includes an integrated thermal or optical video recording camera and digital signal processing;
the sensor section includes an integrated gas detector and analyzer and digital signal processing; and
the sensor section provides automatic transfer of video and detected gas information from the digital signal processing of the video recording camera and the gas detector and analyzer at the docking platform using at least one of wireless, infrared, or optical data transfer.

7. The system of claim 1, further comprising:
a global positioning system (GPS) unit carried by the aircraft and in communication with the flight control system; and wherein
a position and universal time detected by the GPS is placed as a timestamp on data collected by the sensor section.

8. A system comprising:
an aircraft, including:
   a plurality of wing unit propellers for vertical takeoff and landing;
   a control system for controlling flight of the aircraft autonomously;
   a sensor section; and
   a power manager unit; and
a docking platform, including:
   a data exchange unit, wherein the data exchange unit communicates with the sensor section of the aircraft during docking of the aircraft at the docking platform;
   a power supply unit that supplies power to the power manager unit of the aircraft during docking of the aircraft at the docking platform; and a thermal wire mesh for maintaining all-weather operability of the platform with the aircraft.

9. A method comprising:
controlling, both autonomously and from a remote operator location, an aircraft having a plurality of wing unit propellers for vertical takeoff and landing;
operating sensors from the aircraft along a flight path of the aircraft, wherein:
   operating the sensors further comprises detecting a level of gas in the atmosphere along the flight path;
linking the aircraft to a network providing cloud computing for in-situ evaluation of the detected level of gas in the atmosphere along the flight path;
recording data from the sensors;
autonomously landing the aircraft at a docking platform;
communicating the recorded data from the aircraft to the docking platform during docking of the aircraft at the docking platform; and
recharging aircraft batteries from a power supply provided by the docking platform during docking of the aircraft at the docking platform.

10. The method of claim 9, further comprising:
pre-programming a plurality of global positioning system (GPS) waypoints for traversing a flight path by the aircraft, wherein pre-programming includes instructions for adjusting the direction and altitude of the aircraft at each waypoint.

11. The method of claim 9, wherein:
the flight path is routed along a pipeline so that detecting a level of gas in the atmosphere along the flight path includes detecting a level of gas in the atmosphere over the pipeline; and
linking the aircraft to a network providing cloud computing for in-situ evaluation includes evaluation of the detected level of gas in the atmosphere over the pipeline.

12. The method of claim 9, further comprising:
autonomously landing the aircraft using global positioning system (GPS) on a landing platform large enough to compensate for inaccuracy in GPS positioning;
providing guidance of the aircraft under a force of gravity from an off-center position toward a center of the landing platform using a downward sloping shape of the landing platform; and
moving the aircraft, using the force of gravity, toward the center of the landing platform under the shape-provided guidance, to a position that provides electrical contacts for charging a battery of the aircraft.

13. A method comprising:
controlling, both autonomously and from a remote operator location, an aircraft having a plurality of wing unit propellers for vertical takeoff and landing;
using GPS positioning guidance to direct the aircraft to a desired location of a pipeline;
operating sensors from the aircraft along a flight path of the aircraft;
recording data from the sensors, including:
   recording high resolution thermal and optical images by the aircraft;
autonomously landing the aircraft at a docking platform;
communicating the recorded data from the aircraft to the docking platform during docking of the aircraft at the docking platform; and
recharging aircraft batteries from a power supply provided by the docking platform during docking of the aircraft at the docking platform.

14. The method of claim 13, further comprising:
autonomously landing the aircraft using global positioning system (GPS) on a landing platform large enough to compensate for inaccuracy in GPS positioning;
providing guidance of the aircraft toward the center of the landing platform using the shape of the landing platform; and
moving the aircraft using a force toward the center of the landing platform under the shape-provided guidance, to a position that provides electrical contacts for charging a battery of the aircraft.

15. A method comprising:
controlling, both autonomously and from a remote operator location, an aircraft having a plurality of wing unit propellers for vertical takeoff and landing;
operating sensors from the aircraft along a flight path of the aircraft, including:
   collecting a volume of gas with a gas collection fixture mounted on the aircraft, and
   injecting the gas into a gas detector unit for detection and analysis;
recording data from the sensors;
autonomously landing the aircraft at a docking platform;
communicating the recorded data from the aircraft to the docking platform during docking of the aircraft at the docking platform; and
recharging aircraft batteries from a power supply provided by the docking platform during docking of the aircraft at the docking platform.

16. The method of claim 15, further comprising:
autonomously landing the aircraft using global positioning system (GPS) on a landing platform large enough to compensate for inaccuracy in GPS positioning;
providing guidance of the aircraft toward the center of the landing platform using the shape of the landing platform; and
moving the aircraft using a force toward the center of the landing platform under the shape-provided guidance, to a position that provides electrical contacts for charging a battery of the aircraft.

17. A method of autonomous landing of a small unmanned aerial system (sUAS) aircraft, comprising:
autonomously landing the sUAS aircraft using global positioning system (GPS) on a landing platform large enough to compensate for inaccuracy in GPS positioning;
providing guidance of the sUAS aircraft toward the center of the landing platform using the shape of the landing platform; and
moving the sUAS aircraft using a force toward the center of the landing platform under the shape-provided guidance, to a position that provides electrical contacts for charging a battery of the sUAS aircraft.

18. The method of claim 17, wherein
moving the sUAS aircraft using a force comprises using gravity.

19. The method of claim 17, wherein
moving the sUAS aircraft using a force comprises using a magnetic force.

20. The method of claim 17, further comprising:
automatically charging the sUAS aircraft battery, after the sUAS aircraft reaches the position that provides electrical contacts, using one or more of solar cell energy, rectified alternating current, or transformer based electro-magnetic coupling and rectification.

* * * * *